Jan. 24, 1967   A. DRITZ   3,299,483
FASTENING DEVICE
Filed Jan. 4, 1965   6 Sheets-Sheet 1

INVENTOR
ARTHUR DRITZ

BY *Philpitt, Steininger & Priddy*
ATTORNEYS

Jan. 24, 1967 A. DRITZ 3,299,483
FASTENING DEVICE
Filed Jan. 4, 1965 6 Sheets-Sheet 3
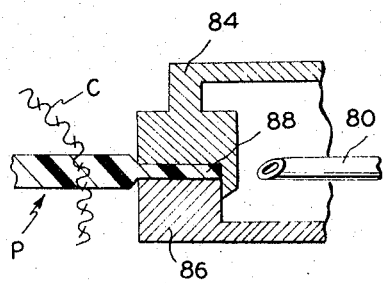
FIG.12
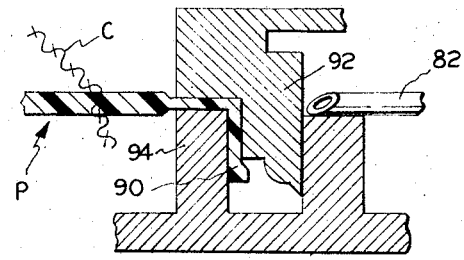
FIG.13
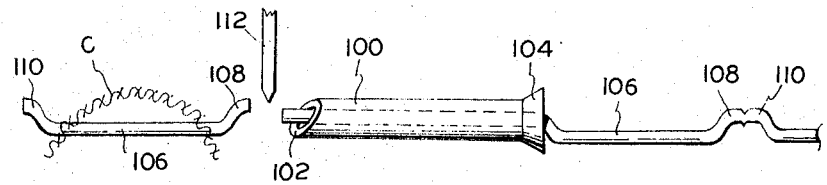
FIG.14
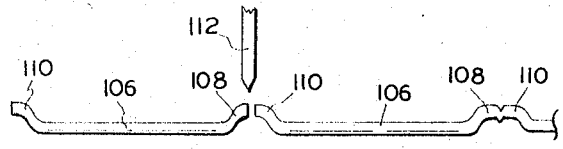
FIG.15
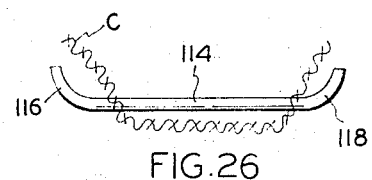
FIG.26
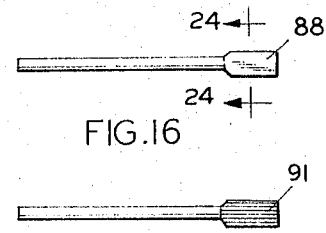
FIG.16
FIG.17
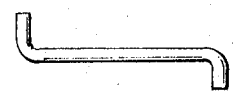
FIG.18A
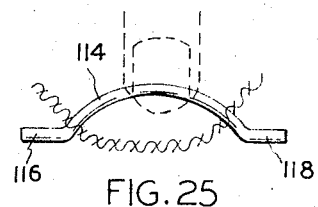
FIG.25
FIG.18
FIG.19
FIG.20
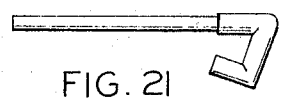
FIG.21
FIG.22
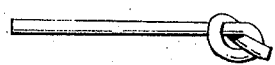
FIG.23
FIG.24
INVENTOR
ARTHUR DRITZ
BY Philpitt, Steininger & Priddy
ATTORNEYS

INVENTOR
ARTHUR DRITZ

Jan. 24, 1967   A. DRITZ   3,299,483
FASTENING DEVICE

Filed Jan. 4, 1965   6 Sheets-Sheet 5

INVENTOR
ARTHUR DRITZ

BY *Philpitt, Steininger & Priddy*
ATTORNEYS

Jan. 24, 1967   A. DRITZ   3,299,483
FASTENING DEVICE
Filed Jan. 4, 1965   6 Sheets-Sheet 6
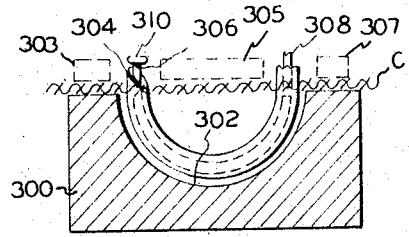
FIG.39
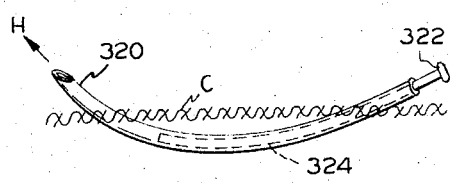
FIG.40
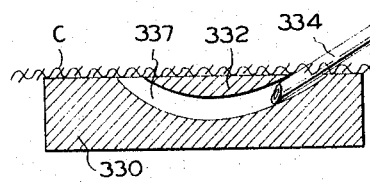
FIG.41
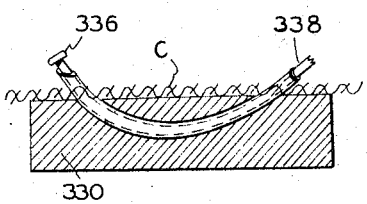
FIG.42
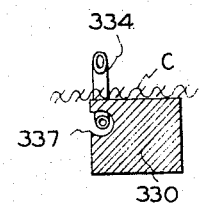
FIG.43
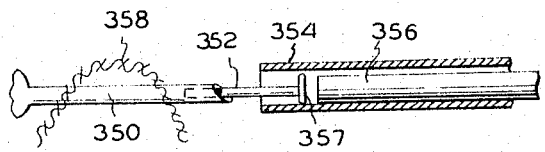
FIG.44
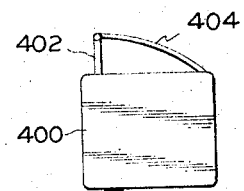
FIG.49
FIG.45
FIG.47   FIG.48
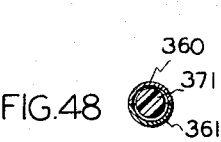
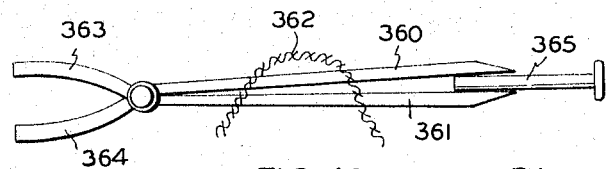
FIG.46
INVENTOR
ARTHUR DRITZ
BY
Philpitt, Steininger & Priddy
ATTORNEYS

United States Patent Office 3,299,483
Patented Jan. 24, 1967

3,299,483
FASTENING DEVICE
Arthur Dritz, 171 Beach at 125th St.,
Rockaway Park, N.Y. 11694
Filed Jan. 4, 1965, Ser. No. 422,945
4 Claims. (Cl. 24—150)

This is a continuation-in-part of three prior applications filed by me, namely Serial Number 57,668, filed September 22, 1960 and now abandoned. Serial Number 186,827, filed April 6, 1962 and now Patent Number 3,182,879 issued May 11, 1965, and Serial Number 332,623, filed December 23, 1963 and now Patent No. 3,209,422 issued October 5, 1965.

This invention generally relates to a novel apparatus and method for temporarily fastening two or more sheets of flexible material together. In one embodiment this invention relates to a device for applying a flexible pin member to two or more layers of material. In another embodiment this invention involves a device for fastening together two or more flexible layers of material with pin members having only blunt ends. This invention involves the use of pin members which are safe to use in that they will not pierce the skin.

My inventions are illustrated by the attached drawings wherein:

FIGURES 12 and 13 are cross-sectional views illustrating a device for cutting off the end of a plastic pin and placing a head thereon;

FIGURES 14 and 15 are perspective fragmentary views illustrating another embodiment of my invention wherein the plastic pins are formed and put into position from a continuous length of plastic material;

FIGURES 16-23 and 18A illustrate pins with a variety of different shaped heads that might be formed and used in accordance with the present invention;

FIGURE 24 is a view along 24—24 of FIGURE 16;

FIGURES 25 and 26 are side views of a further embodiment in accordance with this invention wherein a pin is shown, respectively, being removed and retained in cloth engaging position.

FIGURE 39 is a cut-away view of another embodiment of my invention which utilizes a curved pin guide;

FIGURE 40 is a cut-away view of another curved pin guide member in accordance with this invention;

FIGURES 41-43 are cut-away views showing the placement and operation of a flexible hollow pin inserter guide in accordance with this invention;

FIGURE 44 is a cut-away side view showing a different method of placing a pin in a pin guide member;

FIGURES 45 and 46 are side cut-away views showing a different way of placing pins within a split guide member in accordance with this invention;

FIGURE 47 is a view along 47—47 of FIGURE 45;

FIGURE 48 is a view along 48—48 of FIGURE 45;

FIGURE 49 is a perspective view of a pin inserter device having a magazine and a curved pin inserter guide.

According to one aspect of the present invention my novel fastener device comprises in combination:

(a) a base member, (b) said base member having fixed adjacent one end thereof a cloth contouring and positioning member, (c) a cloth clamping member which is pivotally mounted for movement towards and away from said cloth contouring and positioning member, (d) said cloth clamping member being located adjacent one end of an elongated slide member, (e) a first sliding member and a second sliding member mounted on said slide member, (f) said first sliding member comprising a pointed hollow guide member disposed substantially parallel to said slide member and having an open front end, (g) said first sliding member also comprising a magazine chamber located above said slide member and in open communication with a portion of the interior of said hollow guide member, and (h) said second sliding member including a plunger means operatively connected to said magazine chamber and said hollow guide member in such a manner that the plunger means can be caused to eject pins located within the interior of said hollow guide member.

Figure 4:
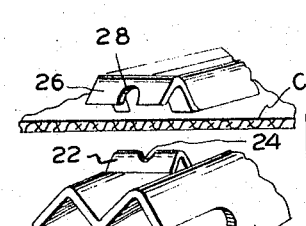
FIGURE 4 is an enlarged fragmentary perspective view of some of the operative elements set forth in FIGURES 1-3.
Figure 1:
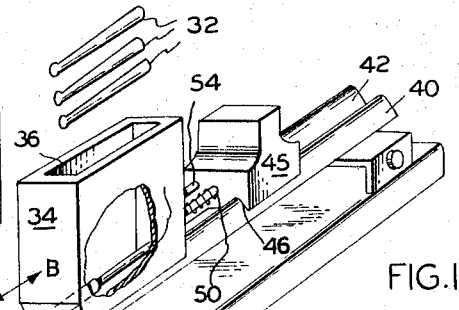
FIGURES 1, 2 and 3 are sequential perspective views showing the operation of one embodiment of my invention.
Figure 2:
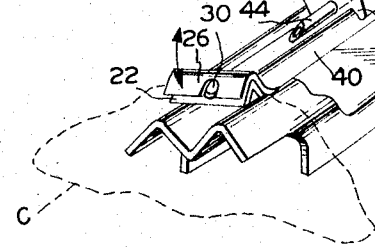
Figure 3:
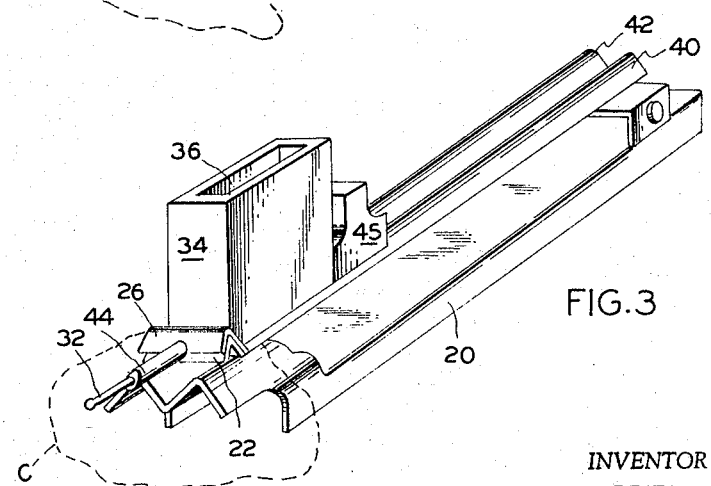

Referring now to FIGURES 1-4, the fastening device is seen to comprise a base member 20. Said base member 20 has attached thereto (by welding or the like) and adjacent the front end thereof, a cloth contouring and positioning member 22. As can be seen best in FIGURE 4, member 22 is generally in the shape of an inverted V and has a notch 24 therein. Immediately above the cloth contouring and positioning member 22 there is a cloth clamping member 26 that is also generally in the shape of an inverted V, but is somewhat larger than the cloth contouring and positioning member 22 so as to closely fit in nested relationship as is shown in FIGURES 1-3. FIGURE 4 is a fragmentary view showing members 22 and 26 in raised or spread-apart position.

Member 26 has a downwardly depending notch 28 therein so that the combined effect of notches 24 and 28 (when the two members 22 and 26 are brought together in nesting relationship) is that a hole 30 is formed that constitutes a passageway entirely through the nested members 22 and 26. The function and importance of this hole 30 will be more apparent in connection with the discussion which follows.

The primary function of member 22 is to contour a piece of cloth (or similar material) into a "crease," "fold," or "bend" so that two thicknesses of cloth can be more suitably penetrated by a pin. The precise shape of member 22 is not critical and may be varied and an inverted V shape has been found quite satisfactory for most uses. The primary function of member 26 is to clamp in place any piece of cloth that is placed on member 22. In FIGURE 4 a piece of cloth C is shown between members 22 and 26 prior to the time that these members are clamped together.

FIGURE 1 shows the cloth C immediately after it has been clamped between members 22 and 26. Once the cloth has been clamped in this fashion, it is ready for insertion of the pin. The pins 32 are housed in a magazine 36 and can be placed into the magazine by merely dropping into the open top thereof. Magazine 36 is a part of a first sliding member 34, which has a contoured bottom edge portion 38 that is designed to slide upon rail members 40 and 42 in the directions indicated by arrows A and B (FIGURE 1). It will further be noted that the lower portion of said first sliding member 34 carries a hollow guide member 44 that has a pointed forward end. The bottom of the pin magazine 36 narrows down to a slot and this slot is in open communication with the interior of the guide member 44. (Guide member 44 does not move relative to member 34.) It is thus seen that the pins fed into magazine 36 will feed one at a time into the interior of hollow guide member 44.

Now if the entire first sliding member is slid forwardly (in the direction of arrow A) the hollow guide member 44 will pass through the previously described hole 30, and in doing so will pierce the cloth C that is clamped between members 22 and 26 (see FIGURE 2). Once this has been done the device is ready for the ejection of the pin through the hollow guide member.

The sceond sliding member 45 has a contoured bottom edge portion 46 (similar to portion 38) that is designed to slide upon rail members 40 and 42 in the directions indicated by arrows A and B (FIGURE 1). A plunger means 50 has one end fixedly mounted in the second sliding member 45 and the other end slideably mounted within the interior of hollow guide member 44. A spring 52 nromally biases the first and second sliding members (34 and 45) away from each other. An alignment rod 54 is provided between said first and second sliding members solely for the purpose of facilitating the aforesaid sliding action and insuring that the plunger means 50 does not get off center when sliding within the interior of said hollow guide member 44.

Once the first sliding member has been slid forward from the position shown in FIGURE 1 to the position shown in FIGURE 2, the hollow guide member 44 has completely penetrated through the folded cloth and it is now time to eject the pin 32 out of the guide member 44 so that the passage of the pin 32 will not be obstructed by the cloth. This is accomplished, as indicated in FIGURE 3, by sliding the second sliding member 45 against the force of biasing spring 52 until the first and second sliding members 34 and 45 either closely approach or abut each other. As this is done, plunger means 50 moves through the hollow guide means 44 in the direction of arrow A, and in doing so ejects at least a portion of a pin 32 (see FIGURE 3).

If the pin inserted in this manner is perfectly cylindrical or if it is pointed at the ends, there is a danger that when the first and second sliding members (34 and 45) are withdrawn back to the positon shown in FIGURE 1, the friction between the exterior of the pin 32 and the interior of the hollow guide member 44 will be sufficient to pull the pin back also. To overcome this possibility it is preferable that the pin either already have an enlarged head portion, or alternatively that the pin be given an enlarged head portion after it has been ejected from the guide member 44.

Figure 5:
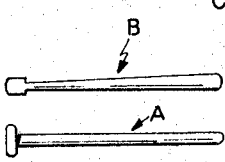
FIGURE 5 is an enlarged perspective view of a pin in accordance with this invention, such pin having an enlarged head section.

FIGURE 5 shows a pin A having an enlarged head section and my copending application Serial No. 332,623 shows other types of pins having at least one enlarged end which are suitable for use in connection with this invention. FIGURE 5 shows a pin B having two ends of substantially the same diameter, and a narrower intermediate portion.

Figure 6:
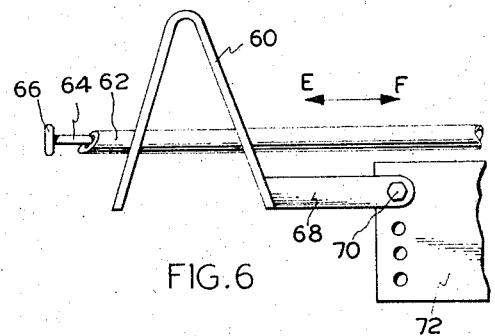
FIGURE 6 is a side view of another embodiment of this invention showing an emerging pin.
Figure 7:
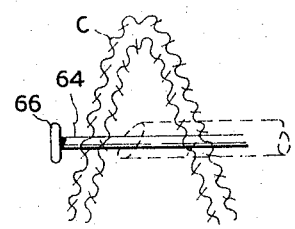
FIGURE 7 shows a pin in place in some cloth after having been placed thereby a device of the type shown in FIGURE 6.
Figure 8:
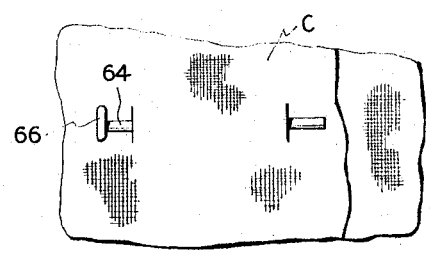
FIGURE 8 is a plan view of a pin in place in · me cloth, having been placed thereby the device shown in FIGURE 6.

FIGURE 6 shows another fastener device in accordance with this invention that is somewhat similar to the device shown in FIGURES 1–4. In FIGURE 6 it will be seen that a single cloth positioning and contouring member 60 is provided so as to contour two layers of cloth in generally the same shape (e.g. see FIGURE 7). An alongated hollow guide means 62 is adapted to pass back and forth through said member 60 in the directions indicated by arrows E and F. In the position shown in FIGURE 6 guide member 62 has passed in the direction of arrow E to the maximum (leftward) extent and the pin 64 is being ejected therefrom by a plunger means (not shown) which could operate in much the same manner as the plunger means described in connection with FIGURES 1–4. It will be noted that the emerging pin has an enlarged head portion 66. Once the hollow guide member 62 has been withdrawn in the direction of arrow F, the threads or filaments of the cloth will close around the shaft portion of the pin 64 and the pin will remain in place in the cloth as indicated in FIGURES 7 and 8. The enlarged head portions 66 prevent the pin 64 from moving in the direction of arrow F and out of the cloth. Pin 64 is preferably made from some resilient material, such as rubber or plastic so that the enlarged head portion can remain compressed within guide member 62 until it is ejected into the enlarged or expanded form shown in FIGURE 6.

Figure 9:
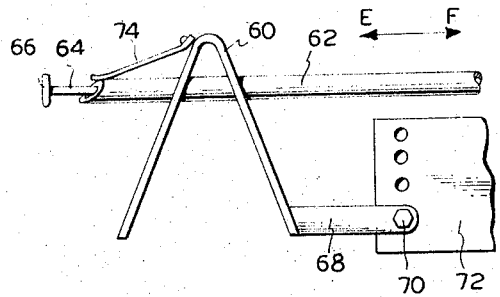
FIGURE 9 is a side view of still another embodiment in accordance with this invention, such embodiment being similar to the embodiment shown in FIGURE 6.
Figure 10:
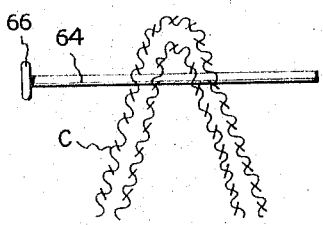
FIGURE 10 is a side view of a pin that has been passed through two layers of cloth with the device shown in FIGURE 9.
Figure 11:
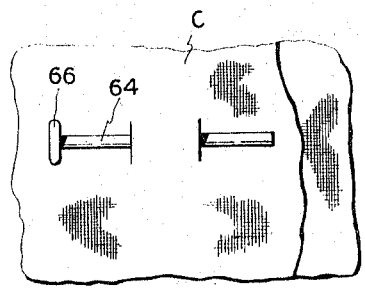
FIGURE 11 is a plan view of a pin that has been passed through cloth when using the device shown in FIGURE 9.

FIGURES 9, 10 and 11 are quite similar to FIGURES 6, 7 and 8 with a few exceptions. First of all, the cloth positioning and contouring member 60 shown in FIGURE 9 has attached to it a rather thin spring-like metallic member 74. The purpose of element 74 is to further insure that the pin 64 will not move in the direction of arrow F. In other words, as the hollow guide member 62 is withdrawn in the direction of arrow F, member 74 will drop slightly so that its lower left pointed edge will contact the head 66 of pin 64 and prevent any further movement of the pin in the direction of arrow F.

In further comparing FIGURES 6–8 and 9–11, it will be noted that the placement of the support brackets 68 of the contouring member 60 (by shifting the position of the bolt 70 in frame 72) can make a noticeable difference in the manner in which the pin 64 is placed in the cloth. More specifically, when the hollow guide member is positioned as shown in FIGURE 6 the majority of the length of the pin can be considered as being inserted in the cloth. However, when the hollow guide member 62 is positioned with respect to the cloth contour means 60 in the manner shown in FIGURE 9 the end result will be that a relatively smaller portion of the cloth will actually be pinned by the pin 64.

FIGURES 12 and 13 illustrate two different but similar devices for putting a "head" on a pin (preferably plastic) that has been inserted through cloth C with the aid of a hollow guide member of the type described in connection with FIGURES 1–11. In FIGURES 12 and 13 it will be seen that the hollow guide member (80 or 82) has in each case already been withdrawn to the right, leaving the plastic pin P in the cloth C. At the time of insertion into the cloth the plastic pin P can be of uniform diameter or cross section (e.g. either round, square, rectangular, eliptical, etc.). However, once the guide member (80 or 82) withdraws to the right, upper and lower jaw members come into play to deform the "back end" of the plastic pin. In FIGURE 12 the upper jaw member 84 and the lower jaw member 86 are shown at the instant that they are clamping and deforming the back end of the plastic pin. If the plastic pin was originally cylindrical in cross section, then the rear head portion 88 will be deformed (flattened) and the resulting pin will have the appearance indicated by FIGURES 16 and 24. If the upper and lower jaws are grooved, then the flattened rear head portion will also contain grooves (e.g. see grooves 91 in FIGURE 17).

The upper and lower jaws (e.g. 84 and 86 in FIGURE 12) may be manually acuated by placement in the levered handle device of exactly the same type utilized in ordinary two-jaw pliers. Alternatively, more sophisticated mechanical arrangements for the jaw members may be used. For example, the upper and lower jaw members 84 and 86 may be operatively associated with the hollow guide member by a mechanical linkage arrangement so that the jaw members will remain spaced (or spread) apart until such time as the hollow guide member withdraws from the pin that has been inserted in the cloth, whereafter the jaw members will be caused to come together as indicated in FIGURE 12.

FIGURE 13 is similar to FIGURE 12, the main difference being that the jaw members 92 and 94 in FIGURE 13 are shaped so that the back end of the plastic pin is bent over, and also simultaneously flattened to a limited extent. It will be appreciated that when the plastic pin has a bent over rear portion 90, the likelihood that the pin will accidentally become disengaged is greatly reduced. Furthermore, when at least one end of a plastic pin is shaped (e.g. in the manner indicated by the pins in FIGURES 18–23) it will be easier for one to grasp and remove the pin from material to which it is attached. The shape and relative placement of the jaw members will of course govern the shape of the end of the pin. The flattened or deformed ends of the plastic pins may be coated with various coating materials if it is desired to either make the pins more attractive or if it is desired to make their location easier to spot. The coating material may be a colored plastic material, colored paint material, a dye, or the like. Also, the interior of the pin member (either along its entire length or only along a portion thereof) may contain encapsulated coloring or coating material so that when the rear end of the pin is mashed between the aforementioned upper and lower jaw members, the encapsulated coloring or coating material will be liberated and will impart a localized coloring effect upon that part of the pin. The action of heat could also be used to effect a color change in a portion of the pin.

It will be understood that the forming devices shown in FIGURES 12 and 13 could also be used to modify the front end of a plastic pin. When both the front end and the back end of a plastic pin is modified, the result would, for example, be similar to that shown in FIGURES 25, 26 or 35 or 36 or 18A. The pin shown in FIGURE 18A has been found to be highly preferable because both sides will lie flat against the cloth, and since the heads are pointed in opposite directions, any tendency of the pin to turn is prevented. However, the pin can be easily withdrawn.

FIGURES 14, 15, 25 and 26 illustrate another embodiment of the invention wherein it is possible to use a continuous length of plastic material for the pins rather than a plurality of separate pins housed in a magazine. In FIGURE 14 there is shown a hollow guide member 100 having a pointed front end 102 and a rear end 104. A continuous length of plastic material is inserted into the rear end 104 of member 100 and it will be noted that in the particular embodiment shown the continuous length of plastic has a generally undulating shape, which can be considered as consisting of elongated substantially straight mid portions 106 and raised portions 108 and 110 located at each end of said mid portion 106. It will be noted in FIGURE 14 that the plastic material, before it enters the rear end 104 is unbroken along its length. Since the rear end 104 is slightly cone-shaped and since the plastic is resilient, the sections 108 and 110 will be substantially "straightened out" as they pass into and through the hollow guide member 100. Of course as the plastic pin emerges from end 102 it will resume its original shape.

Once a length of the plastic pin has emerged from the outlet of the guide member 100 any severing means 112, such as a knife or scissors or the like can be used to disengage the plastic pin that is in the cloth from those pins that are still in the guide means and behind the guide means. FIGURE 15 illustrates this severing concept, as does FIGURE 14.

FIGURES 16–23 illustrate pins with a variety of different shaped heads that might be formed by a severing and forming device of the type set forth in FIGURES 12 and 13.

FIGURES 25 and 26 illustrate another embodiment of this invention wherein a somewhat differently shaped plastic pin is utilized. FIGURE 26 shows a plastic pin 114 in cloth that has upturned end portions 116 and 118. Such a pin could be inserted into layers of cloth by means of a hollow guide member (for instance of the type shown in FIGURE 14). FIGURE 25 illustrates that by finger pressure the type of pin illustrated in FIGURE 26 can be readily turned, bent, pulled and lifted by the fingers at its center to facilitate removal. Of course, there are many possible shapes of plastic pins that could be used.

FIGURES 27–30 illustrate another embodiment of a pin inserting and fastening means in accordance with this invention. In these figures, it will be seen that a piece of cloth C is first clamped between an upper cloth contouring and positioning member 126 (similar to member 26 in FIGURE 1) and a lower cloth contouring and positioning member 128 (similar to member 22 in FIGURES 1–3). The aforesaid members 126 and 128 are hinged on the main frame member 122 by 124 and this pin permits members 126 and 128 to pivot both with respect to each other and with respect to the base 122. Both members 126 and 128 are provided with aligned notches or holes through which a hollow guide needle is adapted to pass (such notches being very similar to the notches 28 and 24 of FIGURE 4) which result in a passageway 130 (very similar to passageway 30 in FIGURE 1). Once the cloth has been thus positioned it is ready to be penetrated by a hollow guide member 132. Hollow guide member 132 is quite similar to member 44 of FIGURES 1–3. The back end of member 132 is supported within member 134 which in turn is part of sliding unit 136. The curved upper portion of member 136 actually constitutes a chamber for a spool of thin plastic filament (thread or wire) that is wound around spool shaft 138. The details of this spool of plastic filament have not been shown since its manner of construction will be obvious. One end of the plastic filament wound around spool shaft 138 is threaded outwardly through the interior of hollow guide member 132, but does not project outwadrly therefrom in the position shown in FIGURE 27. The sliding base member 136 for the hollow guide member 132 and the spool 138 is slideably mounted upon slideway 140 having a slot 142 which insures centering during sliding.

Figure 27:
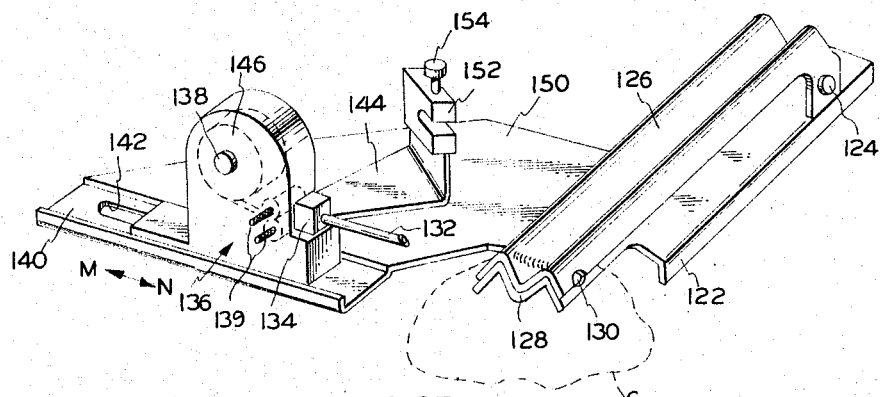
FIGURE 27 is a perspective view and FIGURES 28 and 29 are plan views showing the sequential operation of another embodiment of a pin inserting device in accordance with this invention.
Figure 28:
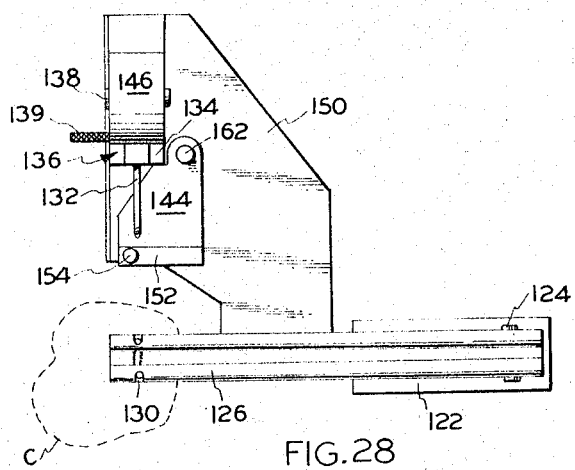
Figure 30:
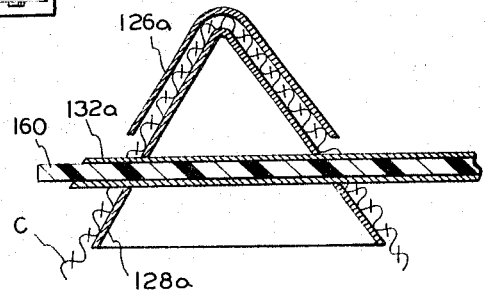
FIGURE 30 is a cross-sectional view illustrating how a plastic pin emerges from a hollow guide member.
Figure 29:
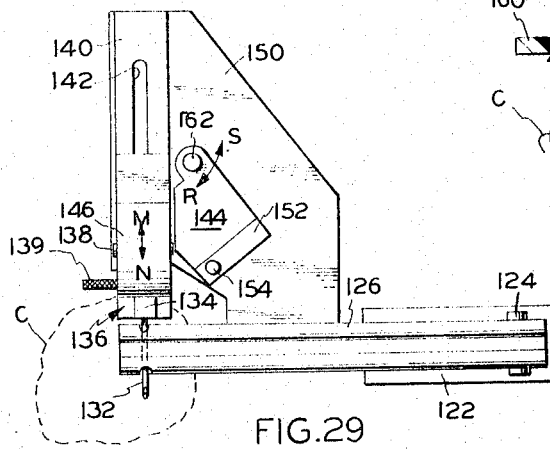

Once the cloth has been firmly clamped between members 126 and 128, the entire sliding unit 136 is moved forward in the direction indicated by arrow N (see FIGURE 29) and in so moving the hollow guide member 132 will pierce the cloth in very much the same manner that the needle 44 in FIGURE 1 and FIGURE 2 pierced the cloth. Once the layers of cloth have been thus completely pierced, the advancing rollers 139 are rotated so that the plastic filament (pressure fed between rollers 139) is pushed out of the end of member 132. FIGURE 30 is a cross-sectional view illustrating more clearly how a plastic filament 160 would emerge from a hollow guide member 132A after the hollow guide member 132A had penetrated cloth C, the cloth being clamped between an upper cloth contouring and positioning member 126A and a lower cloth contouring and positioning member 128A (the filament being unwound from a spool that is not shown). At the same time that the plastic filament is being pushed outwardly from member 132 it is desirable to withdraw the entire member 134. In this fashion the ejected length of plastic filament remains substantially stationary with respect to the cloth while the hollow member 132 moves backwardly (in the direction of arrow M). After the member 132 has been withdrawn entirely from the cloth (or any desired distance in back of the cloth) then a cutting mechanism can be manually or automatically activated to cut off the length of the plastic filament that is in the cloth. One possible type of cutting mechanism is shown in FIGURES 27–29. This particular cutting mechanism is seen to consist of a pivotable base member 144 that pivots about a pin 162 in the directions indicated by arrows R and S (FIGURE 29). In FIGURE 27 the cutting mechanism is shown as having a slotted jaw section 152 into which the plastic filament moves when member 144 moves to its inward-most position, as shown in FIGURE 28. A cutting mechanism 154 (i.e., a drop-knife or the like) can then be depressed manually to cut off the thread. Member 154 is preferably spring loaded so that it can be depressed to cut and then will rise immediately after the cutting operation. Member 144 can be either manually or automatically moved to the previously described positions. However, it is preferable to coordinate the movement of unit 144 with unit 136 so that when unit 134 is moved in the direction of arrow N, unit 144 will automatically move in the direction of arrow S; and when unit 136 moves in the direction of arrow M, unit 144 will automatically move in the direction of arrow R. One way of accomplishing this is to spring bias unit 144 in the direction of arrow R.

Figure 31:
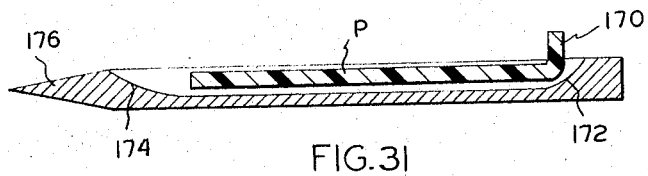
FIGURE 31 is a cut-away view of a further device for inserting plastic pins in accordance with this invention.

FIGURE 31 shows another device for inserting plastic pins in accordance with this invention. The pin inserter is preferably made of metal and consists of a solid conical pointed front end 176 and an interior concave portion having a front sloped surface 174 and a rear sloped surface 172. Sloped surfaces 174 and 172 facilitate the placement of a plastic pin therein. When a plastic pin is inserted as shown, then the entire unit can be passed through one or more layers of cloth. In passing the pin inserter entirely through some cloth (i.e. in a leftward direction), the upwardly extending rear section 170 of the plastic pin P will catch on the cloth and the plastic pin will thereby be retained in the cloth, while the pin inserter passes through the cloth.

Figure 33A:
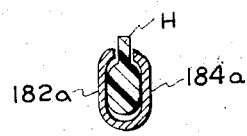
FIGURE 33A is a view similar to FIGURE 33 but with a modified guide section and a headed pin inserted therein.
Figure 32:
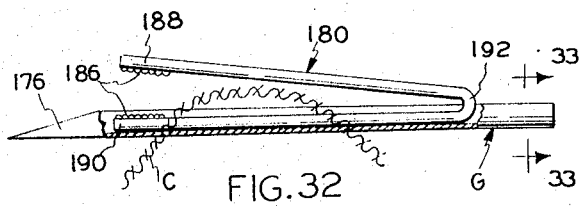
FIGURE 32 is a cut-away view of another device for inserting plastic pins in accordance with this invention.
Figure 33:
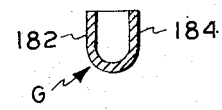
FIGURE 33 is a view along 33—33 of FIGURE 32.
Figure 34:
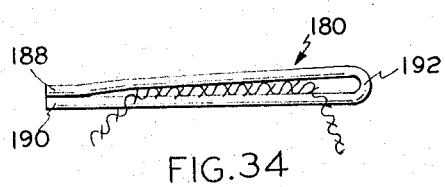
FIGURE 34 shows the type of pin illustrated in FIGURE 32 closed upon itself around a piece of cloth.

FIGURES 32, 33 and 34 show still another embodiment of this invention. In these views the plastic pin is shown at 180, and is seen to consist of two elongated legs 188 and 190 joined by a short curved mid-section 192. In some respects, this pin 180 resembles a hair pin. The plastic pin (or it could be light springy metal) is placed in a guide member G and this guide member essentially consists of only a channeled section of metal having two sides 182 and 184 (see FIGURE 33) and a pointed front section 178. FIGURE 33A shows that the guide member G does not have to be perfectly U-shaped in cross section (as in FIGURE 33), but instead the sides 182A and 184A can be slightly closed over at the top and this configuration keeps the body or shank of the pin in the inserter better and eliminates the tendency of the pin to pop up and out. When using a pin of the type shown in FIGURE 31 in a pin inserter of the type shown in FIGURE 33A, the head H of the pin may have to be made narrower than the body of the pin so that the head can slide through the narrower opening.

FIGURE 32 is partially broken away to show the placement of the pin 180 within the interior of inserter guide G. FIGURE 32 shows how the inserter guide means G can penetrate a layer of cloth and since the pin 180, and particularly the lower leg 190 thereof, is housed within the inserter guide means G, a portion of the plastic pin will *also* penetrate the cloth. Once this penetration has been achieved the inserter guide means G in FIGURE 32 can be withdrawn leaving the pin 180 in the approximate position shown in FIGURE 34. FIGURE 34 shows the two ends 188 and 190 closed together and this has been accomplished in this instance because of the adhesive layers 186 on the interior end portions of both legs 188 and 190. The adhesive can be made sufficiently weak so that it can be opened by finger pressure. Alternatively, the plastic pin 180 could have its ends 188 and 190 fused together by heat, or if the pin is made of silicone rubber material it is possible to simply join legs 188 and 190 together by pressing together the two ends.

Figure 35:
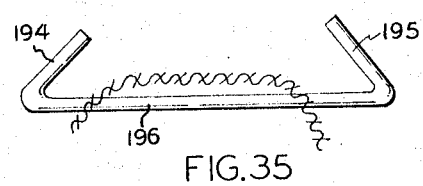
FIGURES 35-38 show various types of pin structures that may be used in accordance with this invention and with the pin inserting devices of this invention.

FIGURE 35 illustrates still another type of pin that could be used in accordance with the present invention. It will be seen that this pin has an elongated straight middle section 196 and two inwardly angled end sections 194 and 195.

Figure 36:
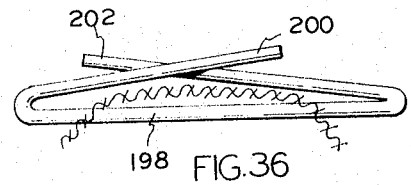

FIGURE 36 shows a slightly different type of pin in that the mid-section 198 is straight whereas the end sections 200 and 202 are angled inwardly toward each other even more than is shown in FIGURE 34, and such end sections even cross each other.

Figure 37A:
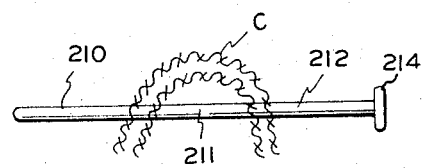
Figure 37:
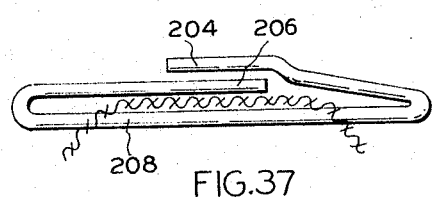

FIGURE 37 shows still another possible type of plastic pin wherein there is an elongated mid-section 208 and two inwardly directed end sections 204 and 206. It is contemplated that the end sections 204 and 206 could be adhered to each other with an adhesive or fused together with heat. Alternatively, if this pin is made of silicone rubber material the ends 204 and 206 could be adhered together simply by applying pressure.

The pins shown in FIGURES 35–37 could be inserted into cloth with guide means of the type shown in the previous figures of the drawings.

FIGURE 37A simply shows a plastic pin having one enlarged head section 214 inserted through two layers of cloth C. A portion of the needle 211 remains within the cloth while sections 210 and 212 remain outside.

Figure 38:
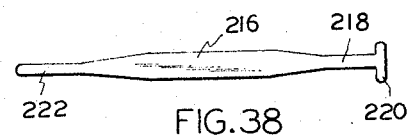

FIGURE 38 shows another embodiment of the invention wherein the mid-section 216 is enlarged in comparison with the adjacent side sections 218 and 222. This type of pin has utility for a number of purposes.

Further with regard to a plastic pin, it has been found that a plastic pin will hold very well in the cloth, but will bend easily when a finger contacts the pointed end. Thus, a plastic pin with a sharp point or even a semi-sharp point is "safe" due to the fact that the leverage from one end to the other is sufficient to permit the plastic pin to bend easily before the point can penetrate the skin of the finger. This is due to the fact that the distance from the point of the pin to the head is sufficiently long enough to permit the pin to bend easily. This follows the principle of the lever. The longer the length of the lever that extends from the fulcrum, the less the amount of force required to move it.

The pins of this invention may be made of plastic material that will dissolve upon contact with water or other liquids. When such pins are used, and left in a garment by oversight, they will dissolve away at the first washing or dry cleaning. Plastic pins made of polyvinyl alcohol or polyethylene oxide will dissolve in water and other plastic materials are available which will perform in a similar manner.

In FIGURES 1–3 and 27–30 the cloth is first crimped or folded before the pin is inserted. Since there may be occasions when such crimping is unnecessary or undesirable (especially where stiff cloth or paper is involved) I have also devised a way to avoid such crimping. As shown in FIGURE 39 the cloth C lies flat over a base 300 which has a cup-shaped channel 302 in it. A permanently curved pin guide 304 can then be inserted through the cloth, down into one end of the channel 302 and up through the other end of channel 302. A flexible plastic pin 306 can then be pushed through the guide 304 by means of a flexible plunger 308. When the guide 304 is withdrawn, the enlarged head 310 of the pin will engage the threads of the cloth and the pin will thereby remain in the cloth. Since the flexible plastic or metal pin has springiness to it, when the needle is totally removed from the cloth, the pin, which was originally straight, will assume its straight position again (due to its inherent resiliency) and lie flat in the same manner as all pins. Blocks 303, 305 and 307 serve to hold the cloth tightly in place.

The permanently curved pin guide 304 shown in FIGURE 39 may be used in conjunction with a pin magazine 400 as shown in FIGURE 49. A plunger means 402 that is actuated by a spring biasing means 404 may be used to push out the pins in the manner set forth in the pin dispenser of my copending application Serial Number 186,827.

FIGURE 40 shows a permanently curved pin inserter 320 that has been inserted through cloth C. A plastic or flexible pin 324 is contained within the inserter 320 and if the inserter is withdrawn completely through the cloth (in the direction of arrow H) the head portion 322 will catch on the threads of the cloth and will therefore remain in place in the cloth.

FIGURES 41-43 show another embodiment of the invention wherein the pin inserter 334 is not permanently curved, but is made of spring steel material. The pin inserter is ordinarily straight but as it enters the curved channel 337 in the base 330, it flexes and curves, as illustrated. FIGURE 43 most clearly illustrates that the slot 337 is open, which permits the pin to be disengaged from the base after the pin has been completely removed from the pin inserter 334.

In all of the embodiments described above, the pin has been shown as passing through the hollow pin inserter from the back end (that is the attached end). It is also possible, and in some instances very desirable (see FIGURE 44), to have the hollow pin inserter 350 pass through the cloth empty and then insert the pin 352 into the front (right) end of the pin inserter 350 (e.g. by means of a plunger 356). As the hollow pin inserter 350 withdraws, the head 357 of the pin 352 will catch on the threads of the material 358 in the usual fashion and the pin will therefore remain in the cloth.

In addition to loading a hollow pin inserter from the front (as is shown in FIGURE 44) it is possible to load a split needle type of pin inserter in a similar fashion. Referring now to FIGURES 45 and 46, the split needle (consisting of halves 360 and 361) passes through the cloth 362 first (i.e. from left to right) and then opens (when the handles 363 and 364 are pressed together). A pin 365 can then be inserted into the opened halves of the split needle (see FIGURE 46). The pin can be of the single, straight type or of the bent over end type illustrated in the pervious figures (e.g. FIGURES 32-36). The split needle is loaded from the front by means of pins propelled through a hollow tube 370 (e.g. by means of a plunger 372) either singly or as a filament. In FIGURE 45 the pin 365 is inserted into the opened halves and then completely enclosed within the hollow center of the split needle. The split needle is then withdrawn (to the left) until the pin is located in the cloth at the desired location. The split halves are then opened and the plunger 371 moved to the right as the split needle moves to the left so as to keep the pin at the proper position in the cloth. (This same general arrangement can be used in a hollow type needle, instead of the split needle.)

A number of different pin inserting devices have been described and illustrated. Some of these should only use plastic pins, some should only use metallic pins, while many of the embodiments can use either plastic or metallic pins. The plastic pins can be made of nylon, polyethylene, polypropylene, polyvinyls, etc., or they can be made of some dissolvable plastic material as noted earlier. Furthermore, the pins may be loose; glued together in either a side-by-side or an end-to-end manner; formed out of a continuous length of plastic material, etc. The cross sectional configuration of the pins may be round, square, rectangular, oblong, triangular, flat, etc.

In conclusion, while the foregoing specification and drawing describe the construction, operation and use of the preferred embodiments of the instant invention, it is to be understood that I do not intend to limit myself to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly, it is intended to encompass all changes, variations, modifications and equivalents falling within the scope of the appended claims.

What is claimed is:

1. A novel pin of resilient wire-like material being bendable to the general shape of an elongated U, at least one end of the pin having adhesive characteristics and adapted to have at least one leg thereof inserted through cloth material when releasably retained within a hollow threading member.

2. The structure of claim 1, wherein the overlapping portions are heat sealable together.

3. The structure of claim 1 wherein there are three sections with a second and third section folded down upon a first section, said second and third sections being adapted to be sealed together.

4. An elongated wire-like pin for insertion in at least one layer of fabric material comprising plastic material that will readily dissolve upon contact with liquids.

References Cited by the Examiner

UNITED STATES PATENTS

| | | | |
|---|---|---|---|
| 1,350,371 | 8/1920 | McCurdy | 227—65 |
| 1,590,415 | 6/1926 | Bragg | 24—150 |
| 1,760,564 | 5/1930 | Reynolds | 281—28 |
| 1,775,357 | 9/1930 | Russell | 227—65 |
| 2,015,149 | 9/1935 | Krzeminski | 24—150 |
| 2,146,295 | 2/1939 | Herrmann et al. | 128—335.5 X |
| 2,407,656 | 9/1946 | Emmer | 281—21 |
| 2,468,821 | 5/1949 | Goodstein | 227—119 X |
| 2,767,451 | 10/1956 | Koehl | 24—150 |
| 2,914,491 | 11/1959 | Bailey | 260—2 |
| 2,935,434 | 5/1960 | Dawson. | |

FOREIGN PATENTS

| | | |
|---|---|---|
| 4,290 | 2/1893 | Great Britain. |
| 394,334 | 6/1933 | Great Britain. |

WILLIAM FELDMAN, Primary Examiner.

DONALD A. GRIFFIN, Examiner.